United States Patent
Okuyama et al.

(10) Patent No.: US 7,197,423 B2
(45) Date of Patent: Mar. 27, 2007

(54) NETWORK DEVICE AND METHOD FOR MANAGING INSTALLATION POSITION OF NETWORK DEVICE

(75) Inventors: Junichi Okuyama, Ashigarakami-gun (JP); Katsuya Mitsutake, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 104 days.

(21) Appl. No.: 10/704,965

(22) Filed: Nov. 12, 2003

(65) Prior Publication Data

US 2004/0122626 A1 Jun. 24, 2004

(30) Foreign Application Priority Data

Dec. 19, 2002 (JP) ............................. 2002-368929

(51) Int. Cl.
*G06F 15/00* (2006.01)
(52) U.S. Cl. ..................................... 702/150
(58) Field of Classification Search ................ 702/150
See application file for complete search history.

(56) References Cited

U.S. PATENT DOCUMENTS 6,286,044 B1 * 9/2001 Aoyama ..................... 709/223

FOREIGN PATENT DOCUMENTS

| CN | 1068438 A | 1/1993 |
| JP | A 2000-284925 | 10/2000 |

* cited by examiner

*Primary Examiner*—John Barlow
*Assistant Examiner*—Cindy D. Khuu
(74) *Attorney, Agent, or Firm*—Oliff & Berridge, PLC

(57) ABSTRACT

When a movement detector section detects that a network device has been moved, a deletion section causes the deletion of pre-movement positional information stored in a positional information storage section. When an alert output section detects a state in which no positional information is set in the positional information storage section, the alert output section outputs an alert. A positional information setter section updates the positional information storage section with post-movement positional information of the network device which is input by an administrator in response to the alert so that the actual installation position matches the positional information set in the positional information storage section. In this manner, the network device avoids a situation in which positional information indicating an installation position before movement is still set even after the device has been moved.

25 Claims, 14 Drawing Sheets

NETWORK DEVICE AND METHOD FOR MANAGING INSTALLATION POSITION OF NETWORK DEVICE

BACKGROUND OF THE INVENTION

1. Field of the Invention

The present invention relates to a method for managing an installation position of a network device connected to a computer network.

2. Description of the Related Art

Computer networks such as the Internet continue to spread widely around the world. To the computer network are connected many devices such as, for example, a copier, a printer, a facsimile device, a scanner, and a multifunction device having these functionalities combined. In particular, in network devices connected to a network i.e. in network devices, because physical media such as paper are used for exchanging information, information on a position to which the device is installed is very important for the user. Therefore, a device administrator manages the installation position of each device by setting the positional information (for example, degrees of latitude and longitude, the address of the installation place, or building number/room number etc.) to storage means built into each device when each device is installed and collecting the positional information from each device via the network.

The network device may be moved to suit user demands. In such a case, the device administrator should update the positional information set to the device with the new positional information.

The positional information, however, generally is not information required for operation of the network device. In other words, the network device can be operated at a new location even when set with positional information of a previous location. Because of this, there may be cases in which the positional information is not changed even though the device has been moved, which causes a problem in that a situation can easily occur in which the stored installation position and the positional information after movement do not match. As a result, even when means for storing positional information is provided in a network device, it was not possible to effectively manage the installation position of the network device using the storage means. Even when the device administrator updates the installation position information every time he moves the device, a user of the device may move the device without notifying the device administrator. Such situations have become increasingly common as the number of devices connected to the network have increased, making it more and more difficult to manage the installation positions of the network devices.

Therefore, it is desirable to resolve the situation in that, when the network device is moved and installed at a different place, the positional information indicating the installation position before the movement is still set in the storage means built into the device.

SUMMARY OF THE INVENTION

The present invention advantageously provides a network device and a method for managing an installation position of a network device which can avoid a situation in which the positional information indicating the installation position before the movement is still set in a device even after the device has been moved.

According to one aspect of the present invention, there is provided a network device comprising positional information storage means for storing positional information indicating an installation position; movement detector means for detecting movement of the installation position; and prevention means for preventing, when a movement is detected by the movement detector means, a situation in which positional information indicating the installation position before the movement is still stored in the positional information storage means.

According to another aspect of the present invention, it is preferable that, in the network device, the movement detector means determines that the installation position has been moved by detecting that a network address which is set has been changed.

According to another aspect of the present invention, it is preferable that, in the network device, the movement detector means determines that the installation position has been moved by detecting that a network number of a network address which is set has been changed.

According to another aspect of the present invention, it is preferable that, in the network device, the movement detector means comprises an infrared emission section, and an infrared sensor section for detecting reflection light of an infrared light emitted from the infrared emission section toward the outside, and the movement detector means determines that the installation position has been moved when the level of the infrared received by the infrared sensor changes.

According to another aspect of the present invention, it is preferable that, in the network device, the movement detector means has a synchronization controller section for synchronizing the infrared emission section and the infrared sensor section and determines that the installation position has been moved when the time from emission to reception of the infrared changes.

According to another aspect of the present invention, it is preferable that, in the network device, the movement detector means has a position measurement section which can measure a current position and determines that the installation position has been moved when the current position changes.

According to another aspect of the present invention, it is preferable that, in the network device, the movement detector section has a power supply monitoring section for monitoring the power supply status and determines that the installation position has been moved when power is supplied for the second time.

According to another aspect of the present invention, it is preferable that, in the network device, the movement detector means has an erroneous detection prevention function for the movement detection.

According to another aspect of the present invention, it is preferable that, in the network device, the movement detector means has an image capturing section which is fixed to capture an image of the same place of the installation position and detects that the installation position has been moved when the image captured by the image capturing section changes.

According to another aspect of the present invention, it is preferable that, in the network device, the movement detector means has an erroneous detection prevention function for the movement detection.

According to another aspect of the present invention, it is preferable that, in the network device, the image capturing operation by the image capturing section is stopped when the device is in operation.

According to another aspect of the present invention, it is preferable that, in the network device, the image capturing section stops the image capturing operation when the image capturing section detects insufficiency in amount of light.

According to another aspect of the present invention, it is preferable that, in the network device, the movement detector means determines that the installation position has been moved only when an amount of change in the image captured by the image capturing section is lower than a predetermined reference value.

According to another aspect of the present invention, it is preferable that, in the network device, the image capturing section is a digital camera.

According to another aspect of the present invention, it is preferable that the network device has at least two of the movement detector means.

According to another aspect of the present invention, it is preferable that, in the network device, the prevention means comprises a notification section for notifying, when the movement detector means detects a movement, a predetermined destination of the movement, and a positional information setter section for updating the positional information storage means with positional information indicating an installation position after the movement which is input in response to a notification by the notification section.

According to another aspect of the present invention, it is preferable that, in the network device, the destination is designated by an electronic mail address.

According to another aspect of the present invention, it is preferable that, in the network device, the prevention means has a deletion section for deleting, when the movement detector means detects a movement, the positional information stored in the positional information storage means.

According to another aspect of the present invention, it is preferable that, in the network device, the prevention means has an alert output section for outputting an alert when it is detected that no positional information is set in the positional information storage means.

According to another aspect of the present invention, it is preferable that, in the network device, the prevention means has a device operation controller section for prohibiting operation until positional information indicating the installation position after the movement is set in the positional information storage means.

According to another aspect of the present invention, it is preferable that, in the network device, the prevention means comprises a position measurement section which can measure a current position; and positional information setter means for automatically setting, when the movement detector means detects a movement, the positional information storage means with a position measured by the position measurement section, as the positional information indicating the installation position after movement.

According to another aspect of the present invention, there is provided a network device comprising positional information storage means for storing positional information indicating an installation position; position measurement means which can measure a current position; and positional information setter means for periodically and automatically updating contents of the positional information storage means with information indicating the current position measured by the position measurement means.

According to another aspect of the present invention, there is provided an installation position management method for managing an installation position by storing positional information indicating an installation position in positional information storage means provided on a network device, the method comprising a movement detection step for detecting that the network device has been moved; and a prevention step for preventing, when movement is detected in the movement detection step, a situation in which positional information indicating the installation position before the movement is still stored in the positional information storage means.

According to another aspect of the present invention, it is preferable that, in the installation position management method for a network device, in the prevention step, the positional information stored in the positional information storage means is deleted when movement is detected in the movement detection step.

According to another aspect of the present invention, it is preferable that, in the installation position management method for a network device, in the prevention step, the deletion of the positional information stored in the positional information storage means is notified.

According to another aspect of the present invention, it is preferable that, in the installation position management method for a network device, in the prevention step, operation of the network device is prohibited until the positional information indicating the installation position after the movement is set in the positional information storage means.

According to another aspect of the present invention, it is preferable that, in the installation position management method for a network device, in the prevention step, the movement is notified to a predetermined destination when movement is detected in the movement detection step.

According to another aspect of the present invention, there is provided an installation position management method for managing an installation position by storing positional information indicating the installation position in storage means provided on a network device, wherein contents of the positional information storage means are periodically and automatically updated with information indicating a current position measured by position measurement means provided on the network device.

According to the present invention, it is possible to avoid a situation in which positional information indicating the installation position before a movement is still set in the positional information storage means even after the network device has been moved. In other words, no mismatch occurs between the positional information set in the positional information storage means and positional information actually indicating the installation position. With this configuration, because the positional information which can be obtained when a network device is searched specifying the positional information is reliable positional information, it is possible to improve convenience of the management of installation positions of network devices.

DESCRIPTION OF PREFERRED EMBODIMENTS

Figure 1:
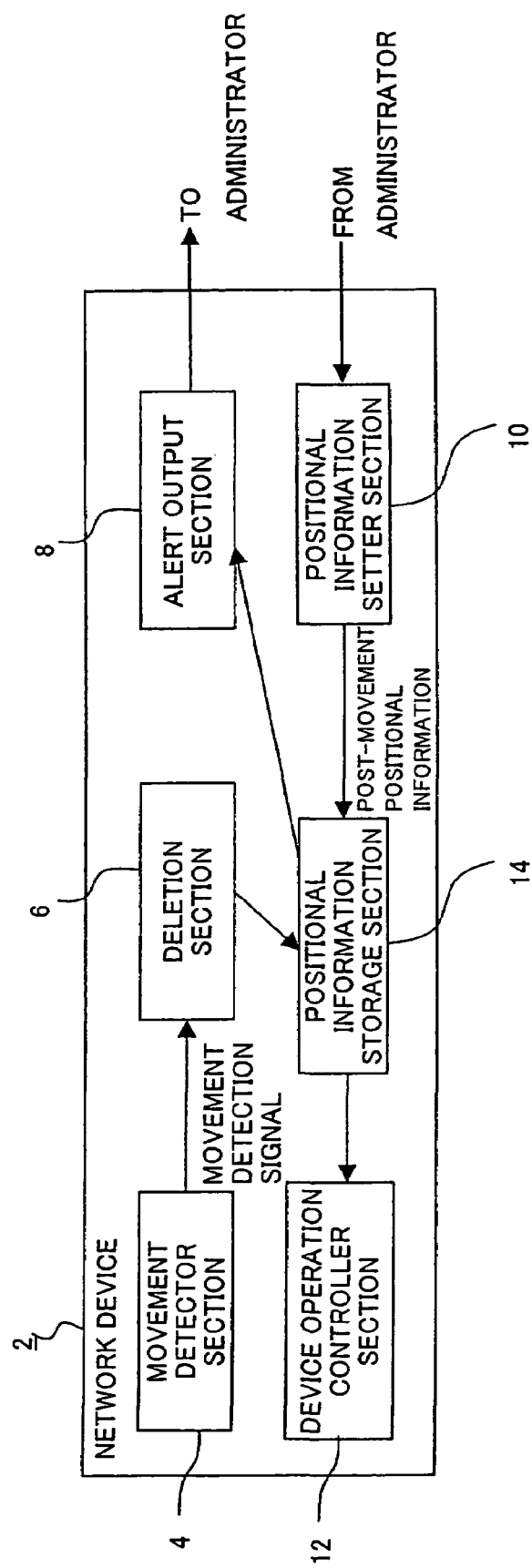
FIG. 1 is a diagram showing a structure of a preferred embodiment of a network device according to the present invention.

Preferred embodiments of the present invention will now be described referring to the drawings.

Embodiment 1.

FIG. 1 is a diagram showing a structure of a network device according to a first preferred embodiment of the present invention. A movement detector section 4, a deletion section 6, an alert output section 8, a positional information setter section 10, a device operation controller section 12, and a positional information storage section 14 are shown in FIG. 1. A network device 2 according to this embodiment may be a copier, a printer, a facsimile device, a scanner, or a multifunctional device in which these functionalities are combined. Although not shown, the network device 2 has elements enabling the device to operate as a network device. The positional information storage section 14 is a memory device for storing positional information indicating a position at which the network device 2 is installed and is realized using, for example, a non-volatile memory device such as an EPROM (Erasable Programmable Read-Only Memory). As the positional information storage section 14, any known memory device may be used. Similar to the conventional art, the positional information may be the degrees of latitude and longitude, address of the installation place, or building number/room number.

Elements and an operation of the device according to the present embodiment will now be described.

When the movement detector section 4 detects that the network device 2 to which the movement detector section 4 is mounted has been moved, the movement detector section 4 transmits a movement detection signal. When the deletion section 6 detects the movement detection signal transmitted from the movement detector section 4, the deletion section 6 unconditionally deletes the positional information stored in the positional information storage section 14. In this manner, it is possible to avoid a situation in which positional information indicating the installation position before movement (hereinafter simply referred to as "pre-movement positional information") remains set in the positional information storage section 14 even after the device has been moved. When the alert output section 8 detects that there is no positional information set in the positional information storage section 14 (for example, data of all "1"s or all "0"s) because the content of the positional information storage section 14 has been deleted, the alert output section 8 outputs an alert indicating that positional information is not set. As the alerting method, it is possible to employ a method such as, for example, lighting a red lamp directly or indirectly connected to the network device 2 or displaying texts such as "positional information is not set" on a display screen of a device managing apparatus, so that the administrator can be notified. Because the network device 2 often have a control panel for allowing operation of the device, it may also be possible to display the alert on the control panel. Upon confirming that positional information is set in the positional information storage section 14, the alert output section 8 cancels the alert.

After the positional information is deleted from the positional information storage section 14, the device operation controller section 12 prohibits operations of the network device 2 until positional information indicating the installation position of destination (hereinafter simply referred to as "post-movement positional information") is set in the positional information storage section 14. This prohibition is realized by issuing a command to a controller function portion of the network device 2 for controlling the network device 2.

The positional information setter section 10 updates the positional information storage section 14 with the post-movement positional information of the network device 2 which is input by the administrator in response to the alert. The administrator inputs information indicating the installation position of the destination by operating on the control panel or the like mounted on the network device 2 or via the network.

In the present embodiment, the network device 2 is configured such that it is possible to detect that the network device 2 has been moved and an alert is provided when the movement of the network device 2 is detected to notify the administrator. With this configuration, it is possible for the administrator to reliably know the movement of the network device 2, even when a third party has moved the network device 2 without the administrator's permission. Thus, it is possible to avoid a situation in which the pre-movement positional information is still set in the positional information storage section 14 even after the movement by the administrator setting and registering the post-movement positional information in the positional information storage section 14 of the network device 2 in response to the notification.

In addition, in the present embodiment, because the network device 2 is configured, by providing a device operation controller section 12, to not operate until the post-movement positional information is set and registered in the positional information storage section 14, the positional information set in the positional information storage means matches the positional information actually indicating the installation position. Therefore, when a user searches for a network device designating positional information, the user can obtain reliable positional information. As a result, it is possible to reduce manpower dedicated to the management of installation positions of network devices which are fixed assets, improve efficiency of maintenance by recoding the history of movement of devices, and allow presentation of optimum device arrangement, which further allows for an advantage that introduction of unnecessary devices can be prevented.

Figure 2:
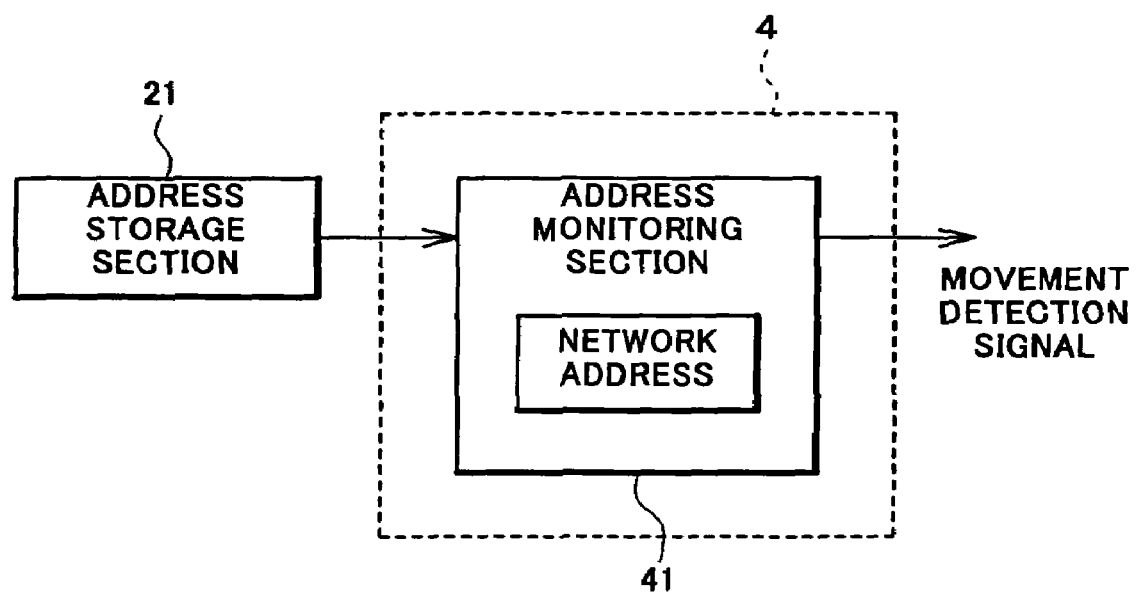
FIG. 2 is a block diagram showing a structure of a movement detector section according to a first preferred embodiment of the present invention.

FIG. 2 shows an example structure of the movement detector section 4. In the present embodiment, the movement detector section 4 has an address monitoring section 41 which determines that the installation position has been moved when a network address set for the network device 2 has been changed.

A network device necessarily has an address on the network as identification information of the device. For example, when the network is the Internet, an address of 32 bits is set which is defined by an internet protocol. The network address includes a network number and a host number. As the network number, a same number is assigned to devices belonging to each of physically separated networks which are called subnets. As the host number, an address for specifying the device within the subnet is assigned and a unique number is assigned to each network device 2 within a subnet. When a network device 2 is moved and is connected to a subnet at the destination, a new network address is assigned to the network device 2 including a network number in the destination subnet. The network device 2 is again recognized on the network when the network address is written into an address storage section 21 in the network device 2.

Figure 3:
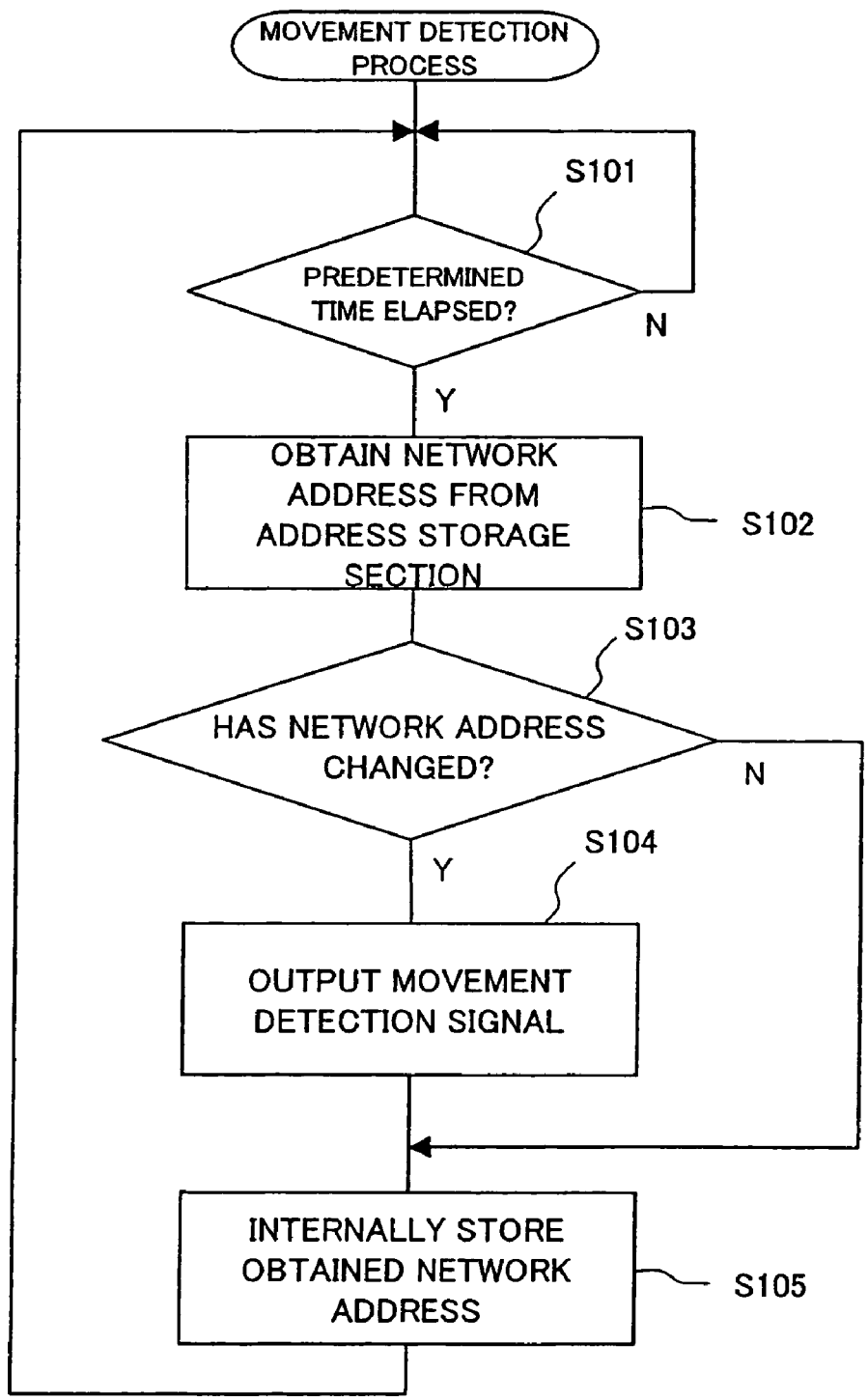
FIG. 3 is a flowchart showing a movement detection process in the first embodiment.

As shown in FIG. 3, the address monitoring section 41 temporarily stores, in an internal memory or the like, the network address stored in the address storage section 21 and attempts to obtain a network address stored in the address storage section 21 periodically at predetermined intervals (steps 101 and 102). The address monitoring section 41 compares the network address set in the address storage section 21 and a network address which is stored internally (step 103), and recognizes that the network address has been changed when the two addresses do not match. The address monitoring section 41 assumes that the network device 2 has been moved when the network address has been changed and outputs a movement detection signal (step 104). The address monitoring section 41 updates the internal memory with the network address obtained from the address storage section 21 regardless of whether or not the movement detection signal has been output and stores the network address (step 105).

The network address is generally fixedly assigned to the network device 2. However, recently, an automatic address assignment service which is called DHCP (Dynamic Host Configuration Protocol) has been put in use. In the DHCP, every time the network device 2 is started up, a network address is assigned to the network device 2. In this case, in step 103, the network numbers alone are compared.

The operation of the movement detector section 4 has been described. The processes after the movement is detected by the movement detector section 4, from the reception, by the deletion section 6, of the movement detection signal from the movement detector section 4, through updating of the positional information storage section 14 by the post-movement positional information are identical to those already described.

Embodiment 2.

Figure 4:
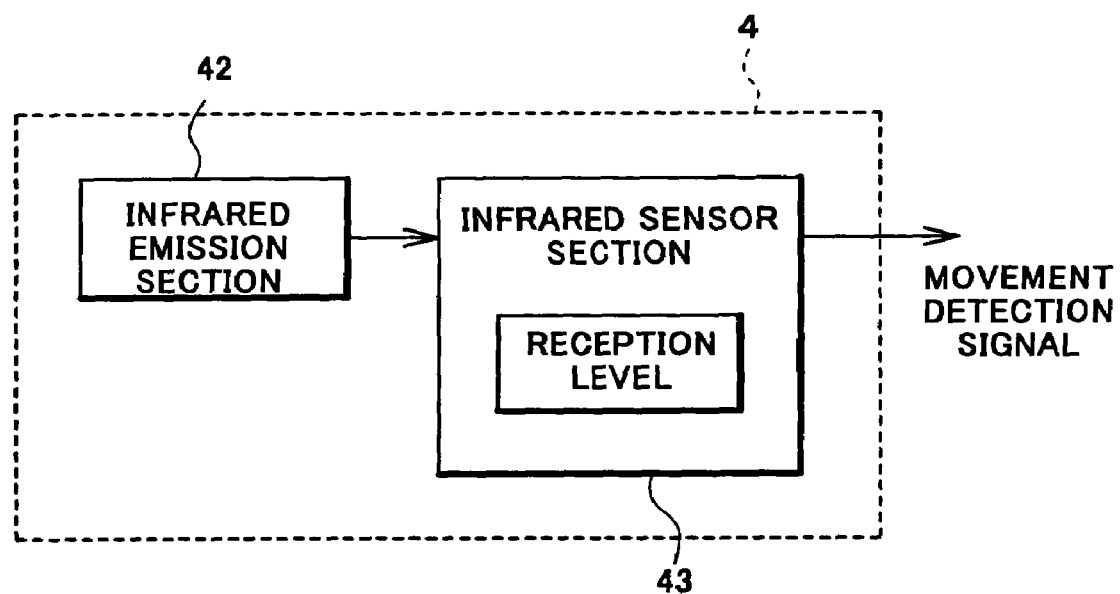
FIG. 4 is a block diagram showing a structure of a movement detector section according to a second preferred embodiment of the present invention.

FIG. 4 is a block diagram showing a structure of a movement detector section 4 according to a second preferred embodiment of the present invention. A movement detector section 4 of the present embodiment includes an infrared emission section 42 and an infrared sensor section 43. The infrared emission section 42 emits infrared light to a direction outside the device from the installation position, and, at the same time, sends an emission period signal to the infrared sensor section 43 which indicates the period of emission. The infrared sensor section 43 measures, in the emission period, the intensity of reflected light of the infrared emitted from the infrared emission section 42, digitizes the measured intensity using a built-in AD converter, and temporarily stores the digitized value in an internal memory. The positional relationship and alignment of the infrared emission section 42 and the infrared sensor section 43 are adjusted such that the infrared sensor section 43 can detect the reflected light. In the present embodiment, the movement of the network device 2 is detected by a change in the reception level of the reflected light.

Figure 5:
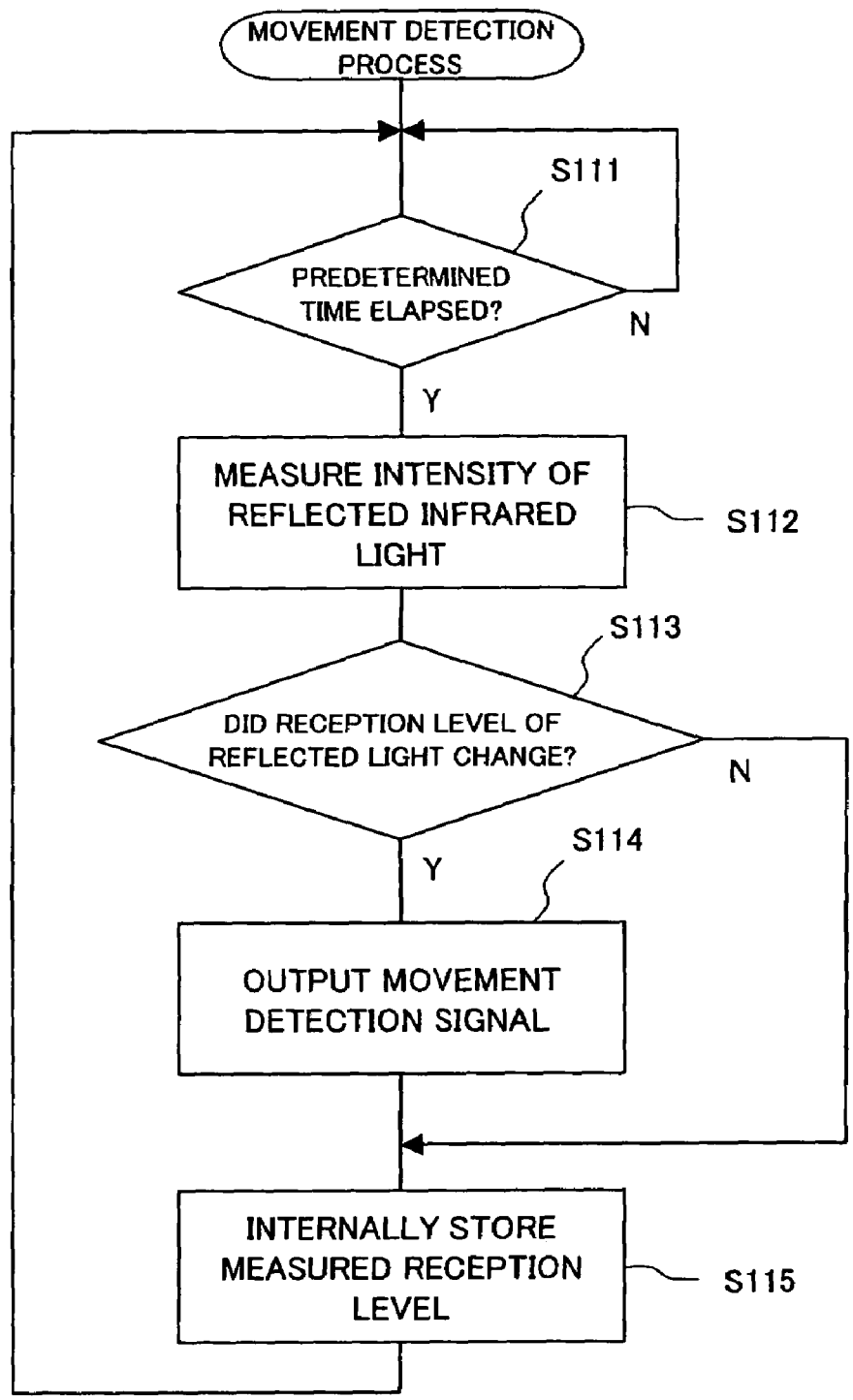
FIG. 5 is a flowchart showing a movement detection process in the second embodiment.

An operation of the movement detector section 4 in the present embodiment will now be described referring to a flowchart shown in FIG. 5. The infrared sensor section 43 temporarily stores the level of the received reflected infrared light in an internal memory and periodically measures the intensity of the reflected light at predetermined intervals (steps 111 and 112). The infrared sensor section 43 compares the measured reception level of the reflected light and the reception level stored internally (step 113), judges that the network device 2 has been moved when the reception levels do not match, and outputs a movement detection signal (step 114). Then, the infrared sensor section 43 updates the internal memory with the measured reception level of the reflected light regardless of whether or not the movement detection signal has been output, and stores the updated reception level (step 115).

The processes following these steps, that is, from the reception, by the deletion section 6, of the movement detection signal from the movement detector section 4, through the updating of the positional information storage section 14 by the post-movement positional information are identical to the processes described earlier.

Figure 6:
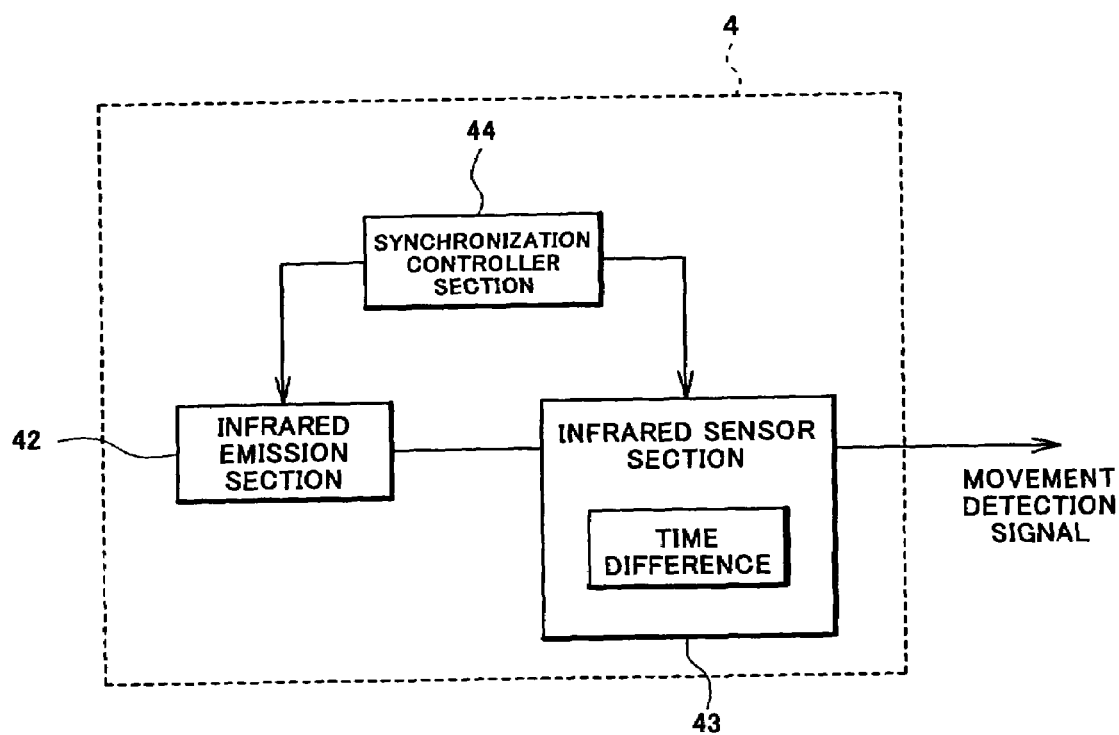
FIG. 6 is a block diagram showing an alternative structure of a movement detector section according to the second embodiment of the present invention.

In this manner, in the present embodiment, advantages similar to those realized in the first embodiment can be obtained. An alterative preferred configuration of the present embodiment will now be described referring to FIG. 6. FIG. 6 shows a synchronization controller section 44 having an internal clock for synchronizing the infrared emission section 42 and the infrared sensor section 43 by supplying the same time information. The infrared emission section 42 is preset to emit infrared light in a predetermined emission time in the time information and the infrared sensor section 43 measures the reception level of the infrared light at the same timing. Because the infrared light is reflected outside of the device, the reflected light is received by the device delayed from the time of emission. The difference between the emission time and the reception time is proportional to a distance between the network device 2 and a reflecting structure. The infrared sensor section 43 temporarily stores this time difference in an internal memory. In this alternative configuration, the movement of the network device 2 is detected by a change in the time difference. It is also possible to configure the device such that a difference in the distance calculated from the time difference, instead of the time difference itself, is stored internally.

In the above description, the movement detection is periodically performed at predetermined intervals. However, there may be cases, for example, in which a person walks through or crosses the optical path of the infrared light, the network device 2 is moved on a table, or supply of power is temporarily stopped for such movement. Therefore, even when the stored reception level and the measured reception level do not match, there may be cases in which the device is not actually moved or is only moved on the table and substantially not moved because of the above-noted reasons. Therefore, it is desirable to provide an erroneous detection prevention function in the movement detection on the movement detector section 4. For example, the device is configured such that even when the comparison of step 113 yields a result of "mismatch", the movement detection signal is not immediately output, but rather, the status changes in the reception level after the mismatch are also considered for decision of movement or a power source is provided for the movement detector section 4 to be operated and make the movement detector section 4 compare the time when the power supply is shut off and reception levels before and after the power supply is shut off.

Embodiment 3.

Figure 7:
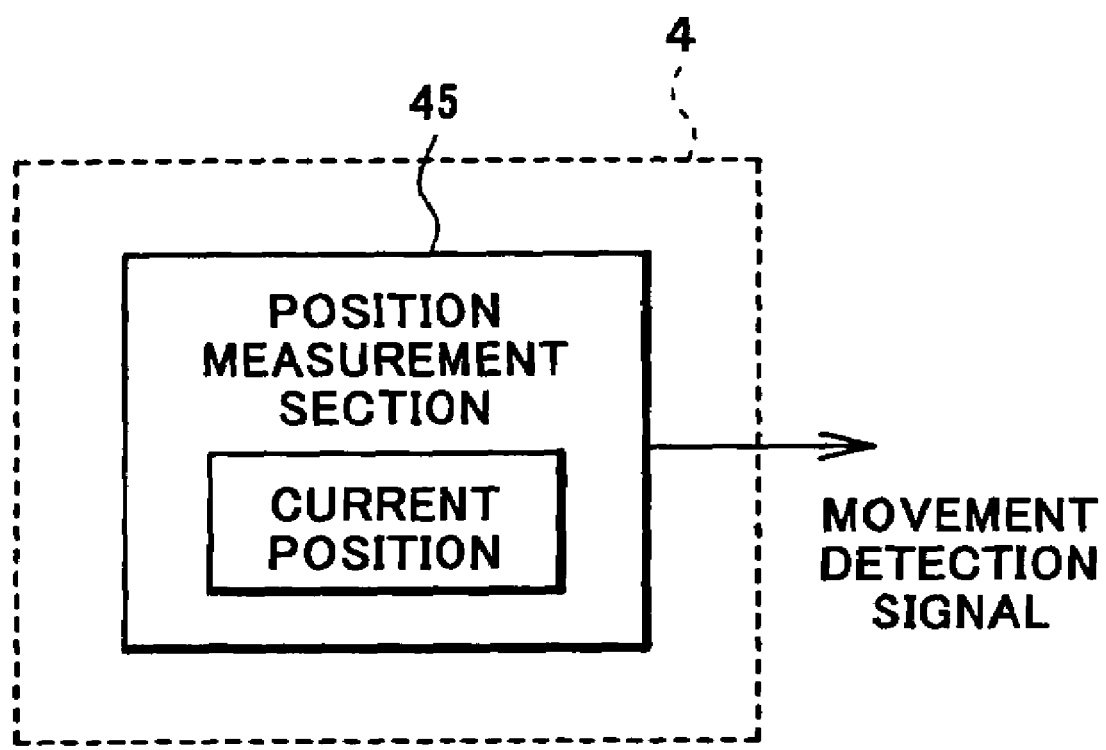
FIG. 7 is a block diagram showing a structure of a movement detector section according to a third preferred embodiment of the present invention.

FIG. 7 is a block diagram showing a structure of a movement detector section 4 in a third preferred embodiment of the present invention. A movement detector section 4 in the present embodiment has a position measurement section 45 which can measure the current position. With the GPS (Global Positioning System), it is possible to know the current position (degrees of latitude and longitude) of the device itself on the earth by measuring distances between the device and a plurality of artificial satellites and through triangulation. In recent years, LSIs including a GPS antenna and a CPU for measuring and calculating their position have been created. Such an LSI GPS is mounted in the position measurement section 45.

Figure 8:
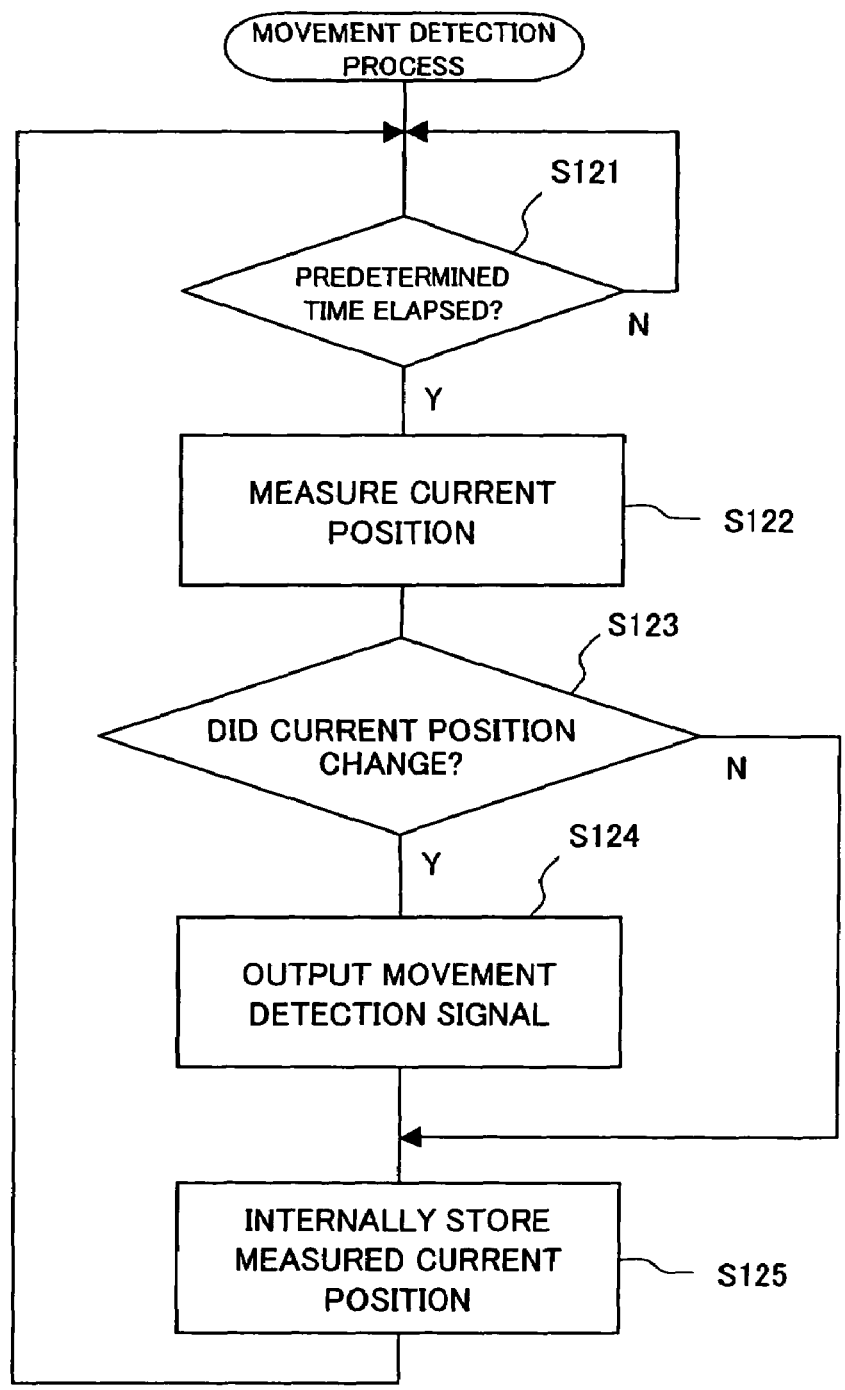
FIG. 8 is a flowchart showing a movement detection process in the third embodiment.

An operation of the movement detector section 4 of the present embodiment will now be described referring to a flowchart of FIG. 8. The position measurement section 45 temporarily stores the measured current position in an internal memory and periodically measures the current position in a predetermined interval (steps 121 and 122). Then, the measurement section 45 compares the measured current position and the current position stored internally (step 123), judges that the network device 2 has been moved when the measured current position and stored current position do not match, and outputs a movement detection signal (step 124). Then, the position measurement section 45 updates the internal memory with the measured current position regardless of whether or not the movement detection signal has been output, and stores the updated current position (step 125).

The processes after this, that is, from the reception, by the deletion section 6, of the movement detection signal from the movement detector section 4, through the updating of the positional information storage section 14 with the post-movement positional information are identical to those already described.

As described, in the present embodiment, advantages similar to those provided by the first embodiment can be obtained. In addition, as described above regarding the second embodiment, there may be cases in which the network device 2 is moved on a table or power supply is temporarily stopped for the movement. In consideration of these cases, it is preferable that an erroneous detection prevention function for the movement detection is provided in the movement detector section 4 which judges that no movement is detected in these cases.

Embodiment 4.

Figure 9:
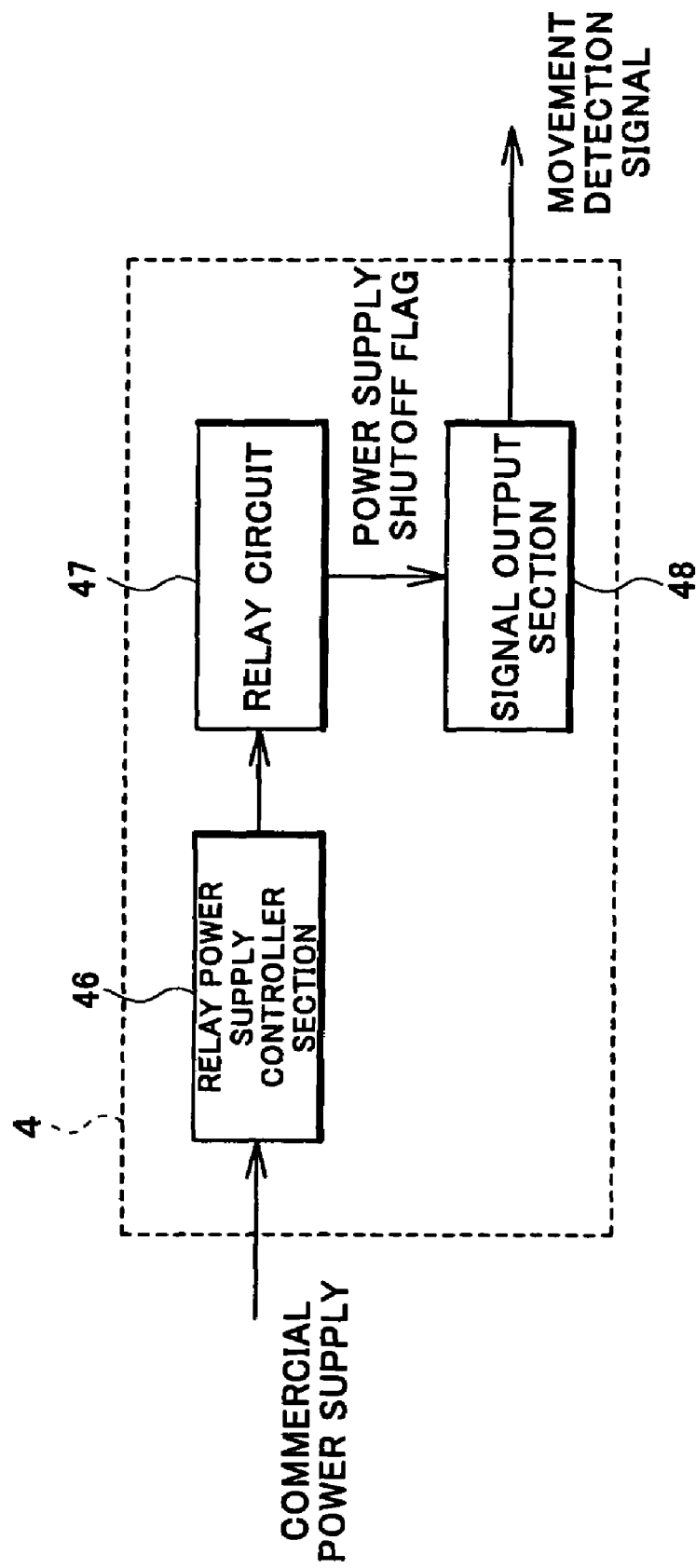
FIG. 9 is a block diagram showing a structure of a movement detector section according to a fourth preferred embodiment of the present invention.

FIG. 9 is a block diagram showing a structure of a movement detector section 4 in a fourth preferred embodiment of the present invention. In this embodiment, the movement detector section 4 has a relay power supply controller section 46, a relay circuit 47, and a signal output section 48. The relay power supply controller section 46 monitors supply of power from a commercial power supply and temporarily stops supply of power to the relay circuit 47 when the commercial power supply is shutoff because the power supply cord of the network device 2 is not plugged in an AC outlet or when the power is first switched on. The relay power supply controller section 46 further starts supply of power to the relay circuit 47 after an initialization signal is input. The relay circuit 47 is a relay having a power shutoff flag in "reset" when power is being supplied and in "set" when no power is supplied. The signal output section 48 outputs an initialization signal when power is switched on and outputs a movement detection signal when the power shutoff flag is set.

The above-described structures cooperatively operate as follows. When supply of power is stopped because the power supply cord of the network device 2 is unplugged from an AC outlet, the relay power supply controller section 46 stops supply of power to the relay circuit 47. Due to the shutting off of the power, the relay circuit 47 maintains the power shutoff flag at the set state.

Then, when the power supply is again switched on, the signal output section 48 outputs an initialization signal. The relay power supply controller section 46 restarts supply of power to the relay circuit 47 upon receipt of the initialization signal. The relay circuit 47 resets the power shutoff flag with the supply of power. In addition, because the relay power supply controller section 46 temporarily stops the supply of power to the relay circuit 47 when the power is switched on, the relay circuit 47 maintains the power shutoff flag at the set state with the shutting off of power. The signal output section 48 outputs a movement detection signal when the power shutoff flag is set after the power is switched on. This process is executed only for one time after the power is switched on.

As described, the movement detector section 4 in the present embodiment is configured such that the state of power supply to the network device 2 is monitored and a movement detection signal is output when the power supply cord of the network device 2 is unplugged from an AC outlet and then power is supplied again, assuming that the re-connection to the AC outlet has been performed in the destination of the network device 2.

The processes after the movement detection, that is, from the reception, by the deletion section 6, of the movement detection signal from the movement detector section 4, through the updating of the positional information storage section 14 with the post-movement positional information are identical to those already described.

As described, according to the present embodiment, advantages similar to those in the first embodiment can be obtained. In addition, as described above for the second and third embodiments, because there may be cases in which the power supply is temporarily stopped in order to move the network device 2 on a table or to replace consumable supplies, it is preferable that an erroneous detection prevention function for the movement detection be provided in the movement detector section 4 such as, for example, judging whether or not the device has been moved through continued time of the power supply period.

Embodiment 5.

Figure 10:
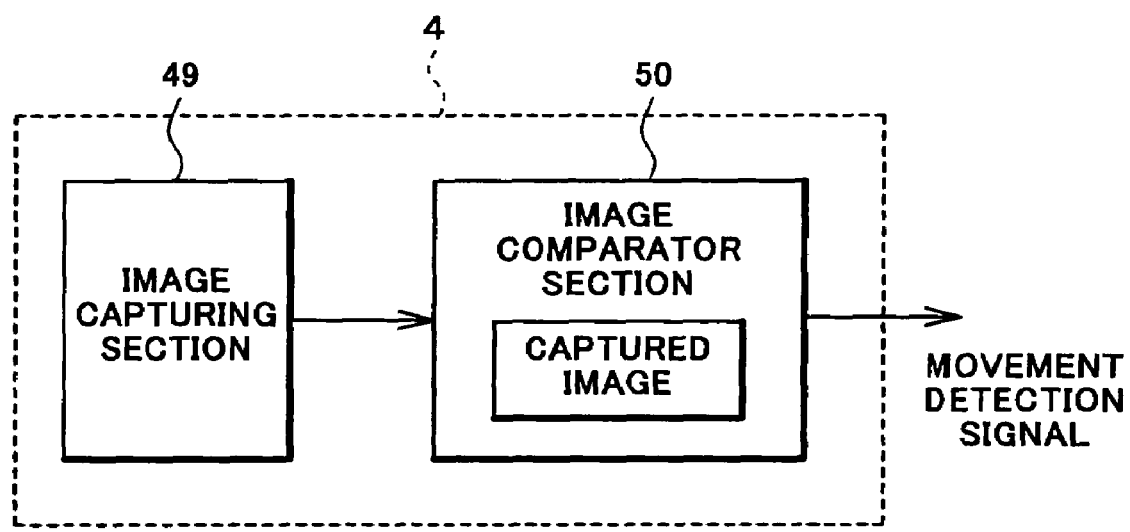
FIG. 10 is a block diagram showing a structure of a movement detector section according to a fifth preferred embodiment of the present invention.

FIG. 10 is a block diagram showing a structure of a movement detector section 4 in a fifth preferred embodiment of the present invention. In this embodiment, the movement detector section 4 has an image capturing section 49 and an image comparator section 50. The image capturing section 49 captures an image of a scene of the same place viewed from the installation position of the network device 2. The image capturing section 49 can capture an image of a scene in an arbitrary direction from the network device 2. The direction is fixed after the image capturing process is started so that the captured scene does not change. In the present embodiment, the image capturing section 49 is realized with a digital camera which performs photoelectric conversion using a CCD sensor. The image comparator section 50 temporarily stores, in an internal memory, the image captured by the image capturing section 49 and compares the captured image and the stored image to determine as to whether or not the network device 2 has been moved.

Figure 11:
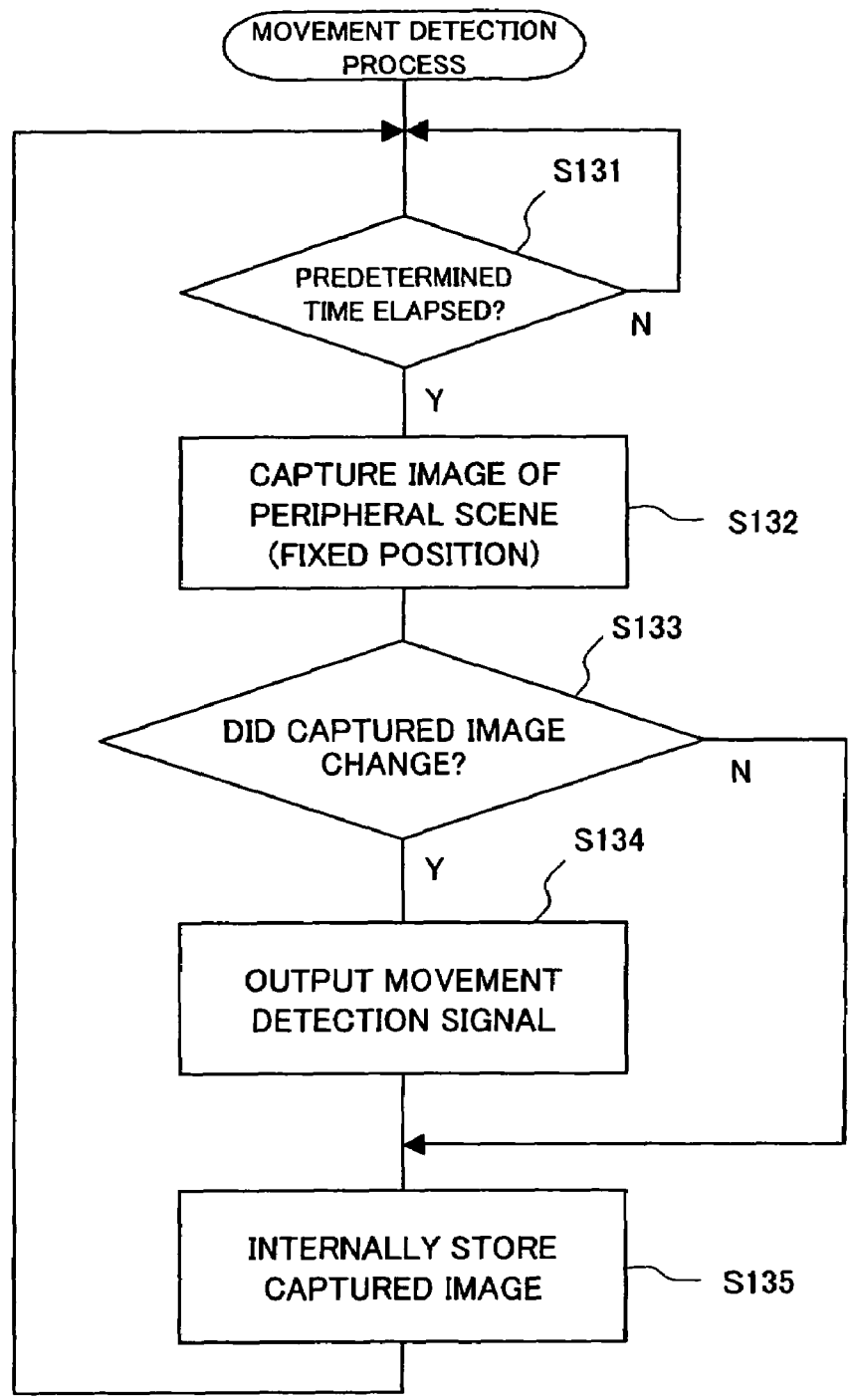
FIG. 11 is a flowchart showing a movement detection process in the fifth embodiment.

An operation of the movement detector section 4 in the present embodiment will now be described referring to a flowchart shown in FIG. 11. The image capturing section 49 periodically captures an image of a peripheral scene viewed from the network device 2 at predetermined intervals (steps 131 and 132). The image comparator section 50 temporarily stores, in an internal memory, a digital image captured by the image capturing section 49 and compares, when the image capturing section 49 captures an image of a scene, the captured image and the image stored internally (step 133). Then, when the images do not match, the movement detection section 4 determines that the network device 2 has been moved and outputs a movement detection signal (step 134). The image comparator section 50 updates the internal memory with the captured image regardless of whether or not the movement detection signal has been output and stores the updated image (step 135).

The processes after the movement detection, that is, from the reception, by the deletion section 6, of the movement detection signal from the movement detection section 4, through the updating of the positional information storage section 14 by the post-movement positional information are identical to those described above.

As described, according to the present embodiment, advantages similar to those of the first embodiment can be achieved. In addition, as described above in the description regarding the second and third embodiments, there may be cases in which the network device 2 is moved on a table or a pedestrian is imaged. Therefore, in the present embodiment, it is preferable to provide an erroneous detection prevention function for the movement detection on the movement detector section 4, similar as in the above-described embodiments. For example, it is possible to determine that while power is supplied to the network device 2 and the network device 2 is operated, the network device 2 is not moved and to configure the device such that image capturing operation by the image capturing section 49 is stopped while the network device 2 is being operated. Alternatively, it is possible to determine that image capturing is difficult at night because the amount of light is insufficient, or, even if it is possible to capture an image, the precision of comparison of the captured images is not sufficient, and to configure the device such that the image capturing process is stopped when insufficiency in the amount of light is detected. Alternatively, in consideration of instances in which a pedestrian is imaged, it is possible to configure the process such that when the result of comparison in step 133 yields a mismatch, the movement detector signal is not immediately output, but rather it is determined that the device has been moved only when the difference in the captured image is lower than a predetermined reference level. For example, it is possible to configure the movement detector section 4 such that a predetermined number of images (for example, 5 images) are captured and it is determined that there has been no movement when a predetermined number of images (for example, 3 images) among the captured images match each other.

In the above-described embodiments, various example configurations of the movement detector means have been described. It is also possible to equip the network device 2 with a combination of an arbitrary number of movement detector means that have been described. When a combination of a plurality of movement detector means is to be mounted, it is possible to configure the movement detectors so that the device is determined to be moved when all of the plurality of movement detector means detect the movement or when any one of the plurality movement detector means detects the movement. Determination of which configuration is to be employed can be made based on a normal judgment for determining movement in consideration of the number and precision of movement detector means to be mounted and installation position of the network device 2, as described above regarding the erroneous prevention function of the movement detection.

Embodiment 6.

Figure 12:
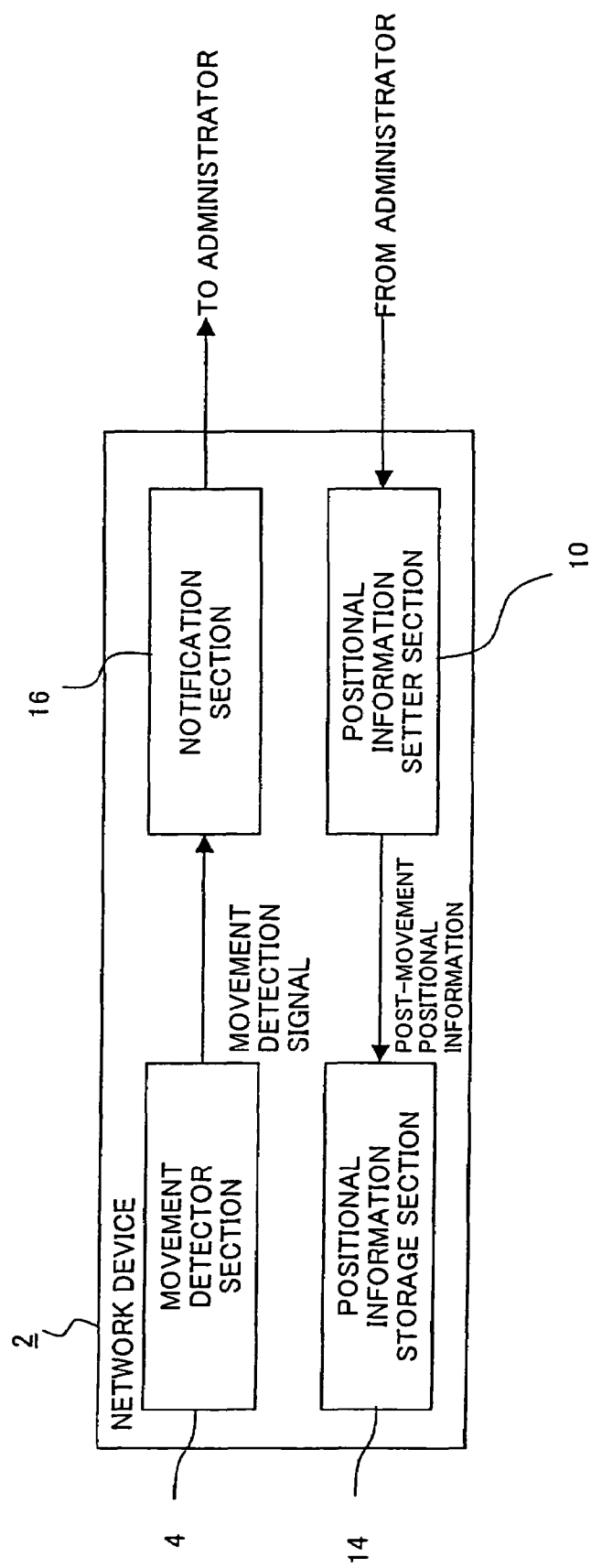
FIG. 12 is a diagram showing a structure of a network device according to another preferred embodiment of the present invention.

FIG. 12 is a diagram showing a structure of a network device 2 according to a sixth preferred embodiment of the present invention. FIG. 12 shows a movement detector section 4, a notification section 16, a positional information setter section 10, and a positional information storage section 14. Elements that are identical to those described above for the first embodiment are assigned the same reference numerals. In the first embodiment, a deletion section 6, an alert output section 8, a positional information setter section 10, and a device operation controller section 12 are provided as prevention means in order to prevent a situation in which positional information indicating the installation position before a movement is still stored in the positional information storage section 14 when the movement detector section 4 detects the movement. In the present embodiment, a notification section 16 and a positional information setter section 10 are provided as the prevention means. The movement detector section 4 in the present embodiment may be realized using at least one of the movement detector sections 4 described in the first through fifth embodiments, similar to the network device 2 shown in FIG. 1.

The elements of the present embodiment will now be described along with operation according to the embodiment.

When the movement detector section 4 detects that the network device 2 to which the movement detector section 4 is mounted has been moved, the movement detector section 4 transmits a movement detection signal. When the notification section 16 detects the movement detection signal transmitted from the movement detector section 4, the notification section 16 transmits to a predefined destination of the movement of the network device 2. More specifically, the notification includes information such as a name for specifying the network device 2 in which movement has been detected and its network address, detection time of the movement, etc. The notification section 16 has a function to transmit a message via electronic mail using SMTP (Simple Mail Transfer Protocol). In consideration of this, in the present embodiment, the electronic mail address of the administrator is designated as the destination. The destination is not limited to the administrator and the number of destinations is also not limited. The positional information setter section 10 updates the positional information storage section 14 with post-movement positional information of the network device 2 input by the administrator receiving the notification from the notification section 16. The administrator inputs the information indicating the installation position after the movement by operating on operating means provided on the network device 2 or via the network.

According to the present embodiment, because the network device 2 is configured such that it is possible to detect movement of the network device 2 when it is moved and the administrator is notified of the detection of the movement of the network device 2 vie electronic mail, the administrator can reliably know that a third party has moved the network device 2 without the administrator's permission even when the administrator is remote. Through setting and registration by the administrator, in response to the notification, the post-movement positional information in the positional information storage section of the network device 2 which transmitted the notification, it is possible to avoid a situation in which the pre-movement positional information is still set in the positional information storage section 14 after the movement.

Although, in the present example the electronic mail address is designated as the destination, the present embodiment is not limited to this configuration and it is also possible to designate other information such as a phone number and a facsimile number as the destination. In such cases, the device requires a function such as an automatic dialing.

Embodiment 7.

Figure 13:
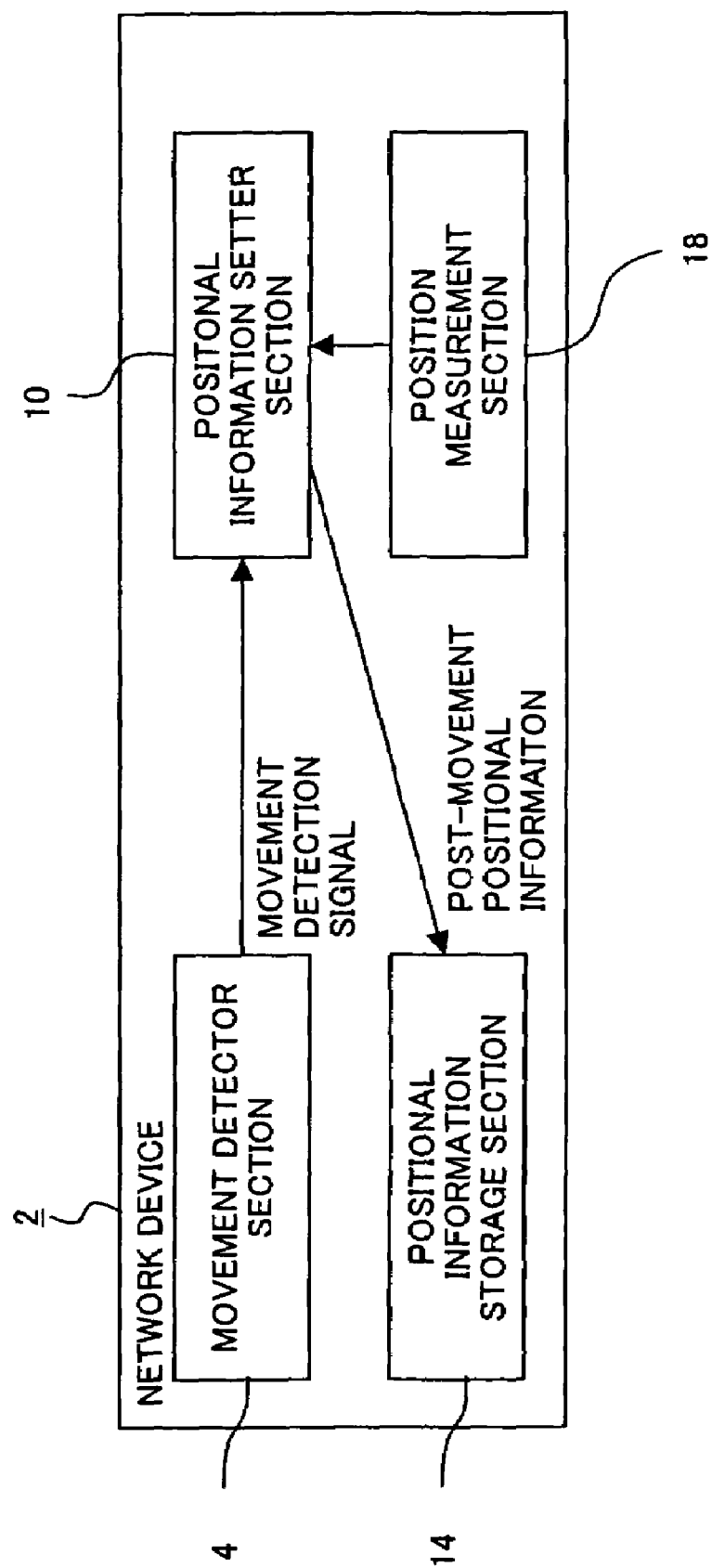
FIG. 13 is a diagram showing a structure of a network device according to another preferred embodiment of the present invention.

FIG. 13 is a diagram showing a structure of a network device according to a seventh preferred embodiment of the present invention.

FIG. 13 shows a movement detector section 4, a positional information setter section 10, a position measurement section 18, and a positional information storage section 14. Elements identical to those in the first embodiment are assigned the same reference numerals. In the present embodiment, a positional information setter section 10 and a position measurement section 18 are provided as the prevention means. The movement detector section 4 in the present embodiment can be realized using at least one of the example configurations described in the first through fifth embodiments similar to the network device 2 shown in FIG. 1. The position measurement section 18 can be realized using the GPS integrated into an LSI as described in the third embodiment. When the movement detector section 4 shown in the third embodiment is employed, it is possible to use a common structure with the position measurement section 45 of the movement detector section 4. The positional information setter section 10 will be described along with an operation in the present embodiment.

When the movement detector section 4 detects that the network device 2 to which the movement detector section 4 is mounted has been moved, the movement detector section 4 transmits a movement detection signal. When the positional information setter section 10 detects the movement detection signal transmitted from the movement detector section 4, the positional information setter section 10 sets the current position measured by the position measurement section 18 in the positional information storage section 14 as the post-movement positional information. The positional information used in the present embodiment is the degrees of latitude and longitude handled by the GPS.

Embodiment 8.

Figure 14:
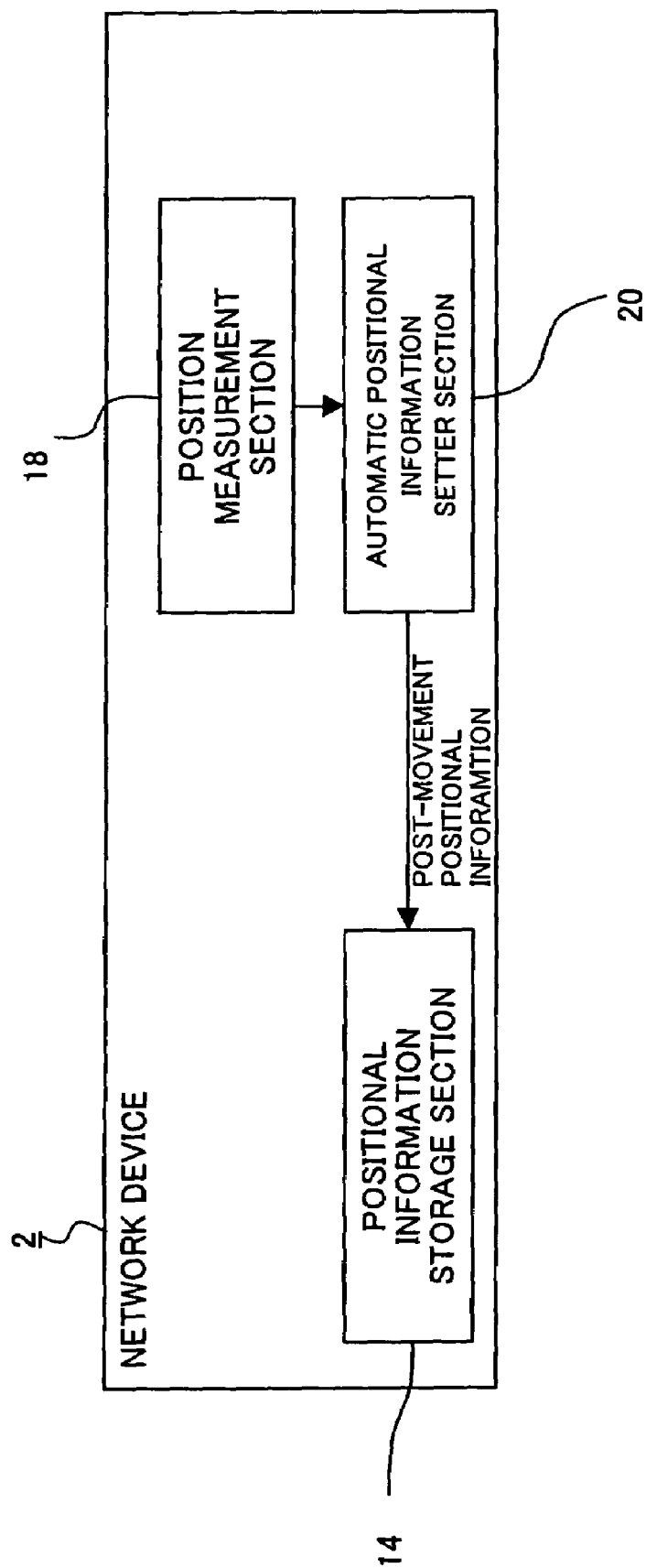
FIG. 14 is a diagram showing a structure of a network device according to another preferred embodiment of the present invention.

FIG. 14 is a diagram showing a structure of a network device according to an eighth preferred embodiment of the present invention.

FIG. 14 shows a position measurement section 18, an automatic positional information setter section 20, and positional information storage section 14. The elements identical to those described in the first embodiment are assigned the same reference numerals. In the above-described seventh embodiment, the current position measured by the position measurement section 18 is set in the positional information storage section 14 when the movement detector section 4 detects a movement of the network device 2. In the present embodiment, the network device 2 is configured such that the current position measured by the position measurement section 18 is set to the positional information storage section 14 regardless of whether or not the movement of the network device 2 is detected. In other words, the automatic positional information setter section 20 in the present embodiment automatically and periodically updates the contents of the positional information storage section 14 with the current position measured by the position measurement section 18 in a preset interval. With this configuration, in the present embodiment, the content of the positional information storage section 14 is unconditionally updated, thus allowing for an advantage that a situation in which the actual installation position of the network device 2 and the installation position stored in the positional information storage section 14 do not match can be avoided.

What is claimed is:

1. A network device comprising:
   positional information storage means for storing positional information indicating an installation position;
   movement detector means for detecting movement of the installation position; and
   means for preventing, detection of movement by the movement detector means by retaining a storage of positional information indicating the installation position before the movement in the positional information storage means; wherein
   the movement detector means determines that the installation position has been moved by detecting that a network address which is set has been changed, wherein the network address includes a network number and a host number.

2. A network device according to claim 1, wherein
   the movement detector means determines that the installation position has been moved by detecting that a network number of a network address which is set has been changed.

3. A network device according to claim 1, wherein
   the movement detector means comprises:
   an infrared emission section, and
   an infrared sensor section for detecting reflected infrared light emitted from the infrared emission section, and
   the movement detector means determines that the installation position has been moved when the level of the infrared received by the infrared sensor changes.

4. A network device according to claim 3, wherein
   the movement detector means has a synchronization controller section for synchronizing the infrared emission section and the infrared sensor section and determines that the installation position has been moved when the time from emission to reception of the infrared changes.

5. A network device according to claim 1, wherein
   the movement detector means has a position measurement section which can measure a current position and determines that the installation position has been moved when the current position changes.

6. A network device according to claim 1, wherein the movement detector section has a power supply monitoring section for monitoring the power supply status and determines that the installation position has been moved when power is supplied for the second time.

7. A network device according to claim 1, wherein the movement detector means has an erroneous detection prevention function for the movement detection.

8. A network device according to claim 1, wherein the movement detector means has an image capturing section which is fixed to capture an image of the same place of the installation position and detects that the installation position has been moved when the image captured by the image capturing section changes.

9. A network device according to claim 8, wherein the movement detector means has an erroneous detection prevention function for the movement detection.

10. A network device according to claim 8, wherein the image capturing section is a digital camera.

11. A network device according to claim 9, wherein the image capturing operation by the image capturing section is stopped when the device is in operation.

12. A network device according to claim 9, wherein the image capturing section stops the image capturing operation when the image capturing section detects insufficiency in amount of light.

13. A network device according to claim 9, wherein the movement detector means determines that the installation position has been moved only when an amount of change in the image captured by the image capturing section is lower than a predetermined reference value.

14. A network device wherein the device comprises at least two of the movement detector means described in claim 1.

15. A network device according to claim 1, wherein the means for preventing comprises:
a notification section for notifying, when the movement detector means detects a movement, a predetermined destination of the movement, and
a positional information setter section for updating the positional information storage means with positional information indicating an installation position after the movement which is input in response to a notification by the notification section.

16. A network device according to claim 15, wherein the destination is designated by an electronic mail address.

17. A network device according to claim 1, wherein the means for preventing has a deletion section for deleting, when the movement detector means detects a movement, the positional information stored in the positional information storage means.

18. A network device according to claim 1, wherein the means for preventing has an alert output section for outputting an alert when it is detected that no positional information is set in the positional information storage means.

19. A network device according to claim 1, wherein the means for preventing has a device operation controller section for prohibiting operation until positional information indicating the installation position after the movement is set in the positional information storage means.

20. A network device according to claim 1, wherein the prevention means comprises:
a position measurement section which can measure a current position; and
positional information setter means for automatically setting, when the movement detector means detects a movement, the positional information storage means with a position measured by the position measurement section, as the positional information indicating the installation position after movement.

21. An installation position management method for managing an installation position by storing positional information indicating an installation position in positional information storage means provided on a network device, the method comprising:
a movement detection step for detecting that the network device has been moved; and
a prevention step for preventing detection of movement in the movement detection step by retaining a storage of positional information indicating the installation position before the movement in the positional information storage means; wherein
the movement detection step comprises determining that the installation position has been moved by detecting that a network address which is set has been changed, wherein the network address includes a network number and a host number.

22. An installation position management method for a network device according to claim 21, wherein
in the prevention step, the positional information stored in the positional information storage means is deleted when movement is detected in the movement detection step.

23. An installation position management method for a network device according to claim 22, wherein
in the prevention step, the deletion of the positional information stored in the positional information storage means is notified.

24. An installation position management method for a network device according to claim 21, wherein
in the prevention step, operation of the network device is prohibited until the positional information indicating the installation position after the movement is set in the positional information storage means.

25. An installation position management method for a network device according to claim 21, wherein
in the prevention step, the movement is notified to a predetermined destination when movement is detected in the movement detection step.

* * * * *